United States Patent [19]

Hoskinson et al.

[11] 4,282,575

[45] Aug. 4, 1981

[54] CONTROL SYSTEM FOR VENDING MACHINE

[75] Inventors: William R. Hoskinson, Elburn; William V. Machanian, DeKalb, both of Ill.

[73] Assignee: The Wurlitzer Company, DeKalb, Ill.

[21] Appl. No.: 65,611

[22] Filed: Aug. 10, 1979

[51] Int. Cl.[3] .................... G06F 15/20; G07F 17/00

[52] U.S. Cl. .................... 364/479; 364/900

[58] Field of Search .................... 364/464, 479, 900; 235/381, 92 SB; 340/149 A, 162; 194/1 M, 1 N, 7, 10, DIG. 1, DIG. 14, DIG. 15, DIG. 27, DIG. 28, DIG. 29

[56] References Cited

U.S. PATENT DOCUMENTS

| | | | |
|---|---|---|---|
| Re. 29,051 | 11/1976 | Jones | 340/149 A |
| 3,815,720 | 6/1974 | Machanian et al. | 194/1 N |
| 3,841,456 | 10/1974 | Levasseur | 194/1 N |
| 3,869,032 | 3/1975 | Wheelwright et al. | 194/1 N |
| 3,894,220 | 7/1975 | Levasseur | 194/1 N |
| 3,982,620 | 9/1976 | Kortenhaus | 194/1 N |
| 3,985,217 | 10/1976 | Kortenhaus et al. | 340/162 |
| 4,008,792 | 2/1977 | Levasseur et al. | 194/1 N |
| 4,045,776 | 8/1977 | Wheelwright et al. | 340/162 |
| 4,056,181 | 11/1977 | Ikeguchi et al. | 194/10 |
| 4,120,452 | 10/1978 | Kimura et al. | 364/479 |

*Primary Examiner*—Errol A. Krass

*Attorney, Agent, or Firm*—Trexler, Wolters, Bushnell & Fosse, Ltd.

[57] ABSTRACT

A control system for a vending machine which accepts coins or bills of different denominations assigns a given amount of credit to each such monetary unit (i.e., a coin or a bill) accepted. The novel structure of the invention allows operation with monetary units in different monetary systems and alterations of the amount of credit assigned to each monetary unit accepted to be effected easily and simply. The control system responds in the same fashion to either a request for refund or change or a selection of an article to be vended: by comparing the accumulated credit from monetary units accepted with the price of each selected article and the request for a refund or change and allowing or inhibiting the dispensing of an article and/or dispensing of a refund or change accordingly. The pricing of articles may also be readily altered to accommodate different articles or changed prices. The control system is embodied in a special purpose computer or microprocessor, cooperating with an encoder circuit for monetary unit valuation and article pricing which comprises a programmable matrix array such as a ROM. Suitable interfacing circuits between the computer or microprocessor and other elements of the control system and of the vending machine itself are also provided.

17 Claims, 7 Drawing Figures

7 SEG
7 SEG
7 SEG
BCD TO 7 SEGMENT
BCD TO 7 SEGMENT
MICRO PROCESSOR
DE MUX
DE MUX
70
68
26
22,32
100
102
104
106
108
110
36
38
44
42
C0 C1 C2 C3 C4 C5 C6 C7
A7 A6 A5 A4 A3 A2 A1 A0
D0 D1 D2 D3 D4 D5 D6 D7
B7 B6 B5 B4 B3 B2 B1 B0
CHANGE REQUEST
OUT OF COINS
VEND COMPLETE
30,34
52
54
56
58
64
66
67
28 LINE TO 18 LINE
18 LINE TO 7 LINE
60
62
40
12,24
28

Fig. 2B.
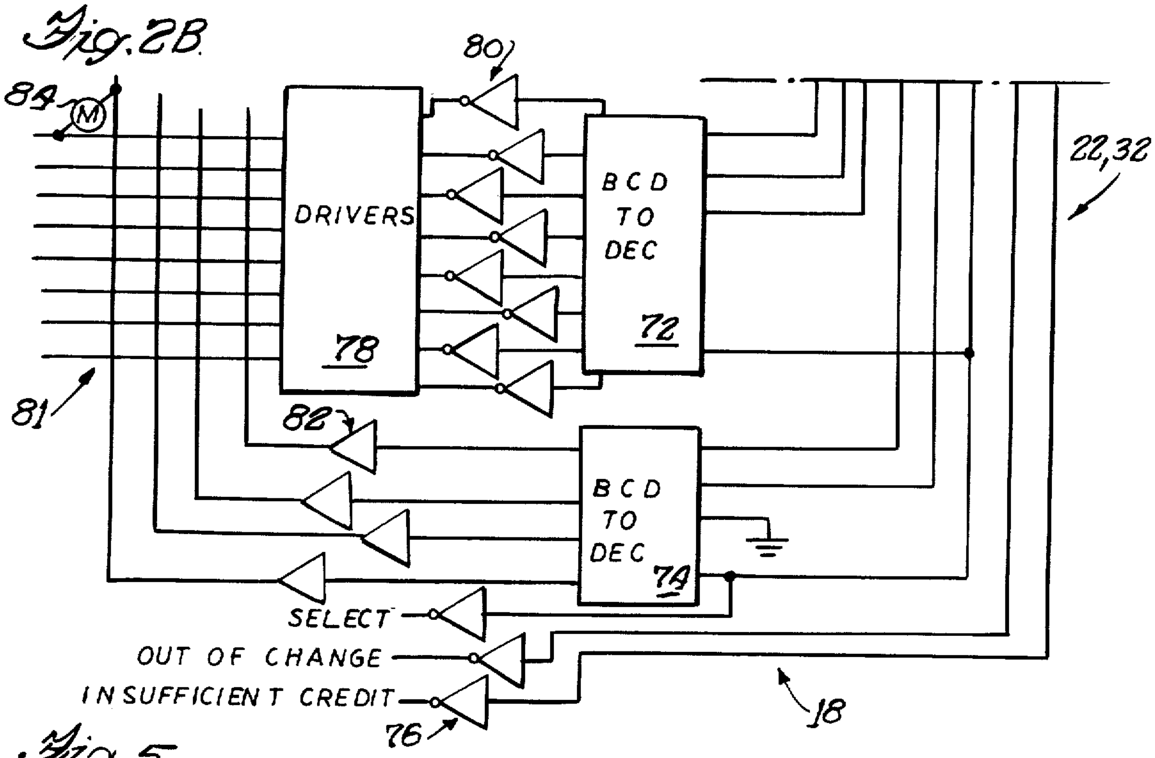
Fig. 5.
Fig. 6.
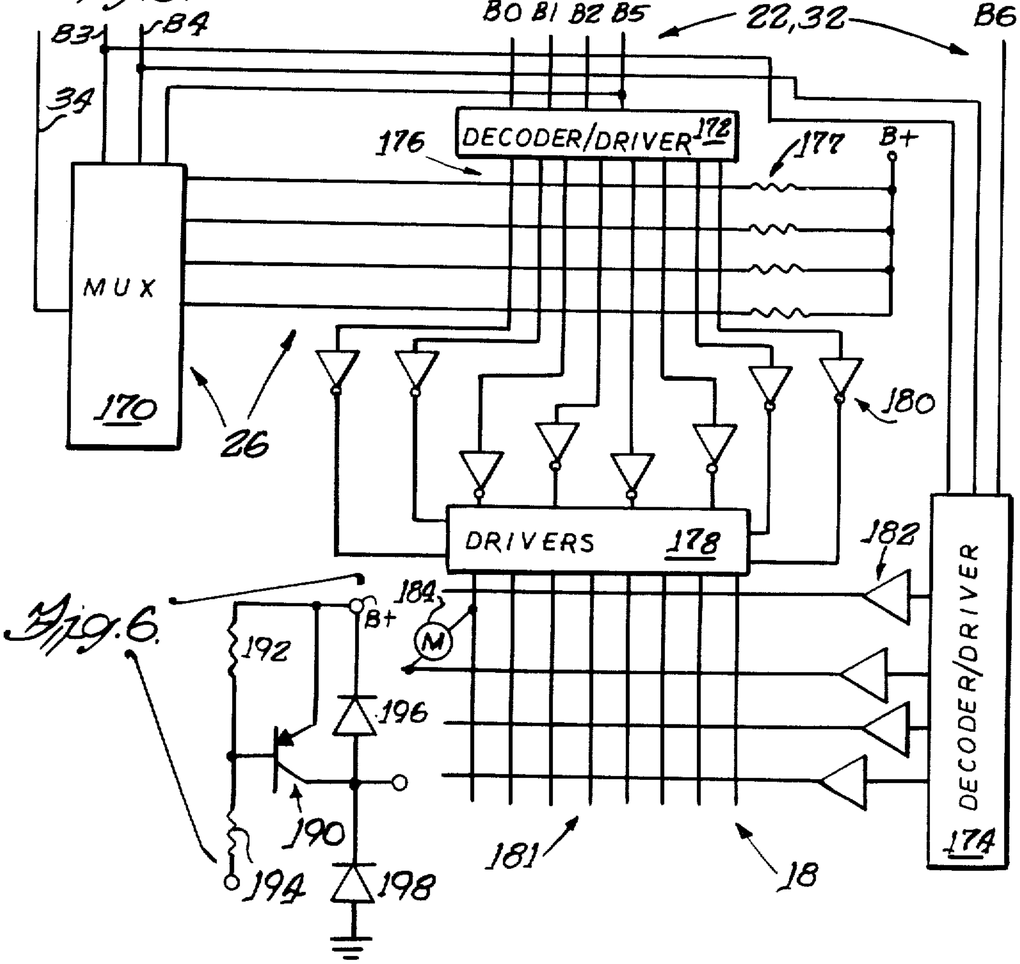

CONTROL SYSTEM FOR VENDING MACHINE

BACKGROUND OF THE INVENTION

This invention relates generally to improvements in electronic control of mechanical, electro-mechanical and similar apparatus and, more particularly, to a novel control system for a vending machine or the like.

While the present invention is suitable for controlling any of a broad variety of mechanical or electro-mechanical devices, it will hereinafter be described embodied as a control system for a vending machine of the type having a number of individually selectable articles. It will be understood, however, that the principles of the present invention are similarly applicable to other, similar devices, for example, to a coin-operated phonograph or "jukebox".

Until relatively recently, control systems for vending or like machines have included primarily mechanical and electromechanical elements such as levers, relays, cams, springs and the like. More recently, however, control systems have been proposed utilizing various solid state electronic components such as diodes, transistors and integrated circuits. While offering increasingly better reliability and cost effectiveness, such electronic control systems have not heretofore possessed a great deal of flexibility. For example, greater flexibility would be advantageous in the acceptance of different types of monetary units, the setting of credit or price levels for vending of different articles, or the handling of requests for refunds or change. While all of these functions have generally been available to some extent, increased flexibility in these areas has generally meant a proliferation of components, often resulting in redundancy of parts and an attendant decrease in the reliability of the control system as well as unacceptable increases in the cost thereof.

However, with the advent of advanced integrated circuit technology, increased flexibility and improved capabilities of such a control system, without the heretofore attendant problems of undue proliferation of electronic components, has become possible.

Accordingly, the present invention is concerned with the provision of a greatly simplified control system for a vending machine, which surprisingly offers far greater flexbility than heretofore known control systems. For example, the control system in accordance with the present invention readily accommodates a plurality of vendable articles or items at many different prices, while also receiving coins or bills of a plurality of different denominations. The control system of the invention is further readily alterable by the user to change the prices of one or more articles to be vended as desired, as well as to accept monetary units (i.e. coins or bills) of different values or in a different monetary system.

OBJECTS AND SUMMARY OF THE INVENTION

Accordingly, it is an object of the present invention to provide a new and improved control system for a vending machine or the like, which comprises relatively few components and yet is capable of controlling a relatively complex vending or like machine.

It is a further object of the present invention to provide a control system in accordance with the foregoing object which is further capable of being easily altered by the user to accommodate changes in the articles to be vended, changes in the prices of articles to be vended or changes in the types of monetary units to be accepted (either in terms of coin or bill denominations or in terms of a change of monetary systems).

It is a further object to provide a control system in accordance with the foregoing objects which is further suitable for use with any of a broad variety of vending machines.

Yet another object is to provide a control system in accordance with the foregoing objects which is relatively simple and inexpensive and yet highly reliable in operation.

Briefly, and in accordance with the foregoing objects a new and improved control system for a vending machine or the like comprises: encoding circuit means responsive to the acceptance of money deposited in said vending machine and responsive to each selection of an article to be vended for producing encoded signals representing the values of monetary units accepted and the prices of articles selected and control circuit means responsive to said encoded signals and to user actuation of article selection and refund requesting means of the vending machine for producing a plurality of control signals to control the dispensing of selected articles and the dispensing of refunds.

BRIEF DESCRIPTION OF THE DRAWINGS

The present invention will be more readily understood and appreciated upon a reading of the following detailed description of the illustrated embodiments and reference to the accompanying drawings, wherein:

FIGS. 2A and 2B taken together, form a circuit schematic diagram of one embodiment of the present invention;

FIG. 5 is a circuit schematic illustrating a portion of the embodiment of FIG. 4 in additional detail, and FIG. 6 is a circuit schematic illustrating a circuit usable in either of the embodiments of FIG. 2B or FIG. 5.

DETAILED DESCRIPTION OF THE ILLUSTRATED EMBODIMENTS

Figure 1:
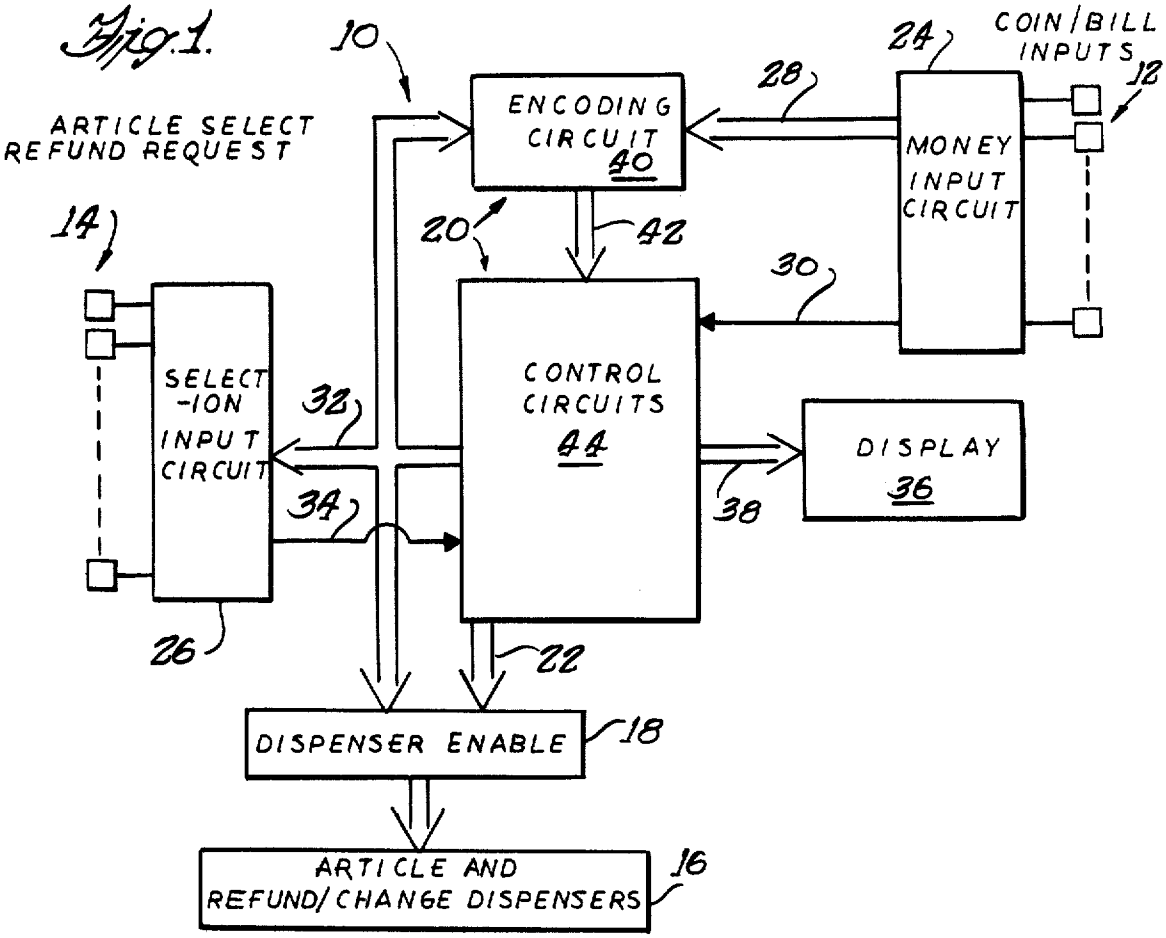
FIG. 1 is a functional block diagram of a control system in accordance with the present invention.

Reference is initially invited to FIG. 1, wherein a control system according to the invention is embodied in a typical or exemplary vending machine, designated generally 10. Conventionally, the vending machine 10 includes a plurality of money accepting means designated generally 12, which may comprise coin slots, bill acceptors, or the like. Also conventional article selection and change or refund request means, designated generally 14 are included in the vending machine 10. These latter article selection and change or refund request means generally comprise user actuable controls such as switches or the like for selecting either an article to be dispensed or vended by the machine 10 or to request change or a refund. Further, and also according to conventional practice, the vending machine 10 includes article dispensing means and change or refund dispensing means designated generally 16. These articles and change or refund dispensing means typically comprise electro-mechanical devices such as motors, relays or the like for dispensing or vending the articles selected or change or refunds requested in accordance with operation of the article selection and change or refund request means 14 and in accordance with operation of a novel control system 20 in accordance with the invention. Conventional driver circuit means 18 are also provided for generating suitable drive signals to power the article and change dispensing means 16, in response to control signals from the control system 20 over lines 22.

The control system 20 receives input signals from a money or monetary unit input circuit 24 and a selection input circuit 26. The former money input circuit 24 is coupled with the money input or accepting means 12 and provides output signals over lines 28 and 30 in response to the deposit of each monetary unit (e.g., a coin or bill) and acceptance thereof by the money accepting means 12. In one practical and preferred embodiment, the line 28 is taken at a point in the money circuit 24 which produces a signal indicative of the particular one of the money accepting inputs 12 at which a coin or other monetary unit has been accepted, while the signal on the line 30 is indicative only of the acceptance of a monetary unit at any of the money accepting means 12.

The selection input circuit 26 receives suitable input signals from the control system 20 of the invention over lines 32 and feeds signals thereto on a line 34. Similarly to the money input circuit 24, in one practical and preferred embodiment, the signals on line 32 correspond to the particular article selected or to a change or refund request, while the signals on the line 34 correspond to actuation of one of the available article selection or change or refund request means 14.

In accordance with a further preferred embodiment, a display means 36 is also provided, and is energized by suitable control signals from the control circuit 20 received over lines 38.

Referring now to the control system 20, an encoding circuit 40 receives the signals on the lines 28 from the money input circuits 24 and also the selection signals on the lines 32 from novel control circuits 44. Advantageously, this encoding circuit is responsive to these inputs for producing encoded signals representative of the values of the monetary units accepted and representing the prices of articles selected, and outputting these encoded signals on lines designated generally 42. The control circuit 44 receives these encoded signals on lines 42 and also the signals on the lines 30 and 34 from the money input circuits 24 and selection input circuits 26, respectively.

Briefly, in operation the control circuit 44 is responsive to the signals received, as described above, for providing suitable control signals over the lines 38 and 22, respectively, for energizing the display 36 and the driver circuits 18 for the article and change dispensing means 16. For example, the control circuit 44 produces suitable signals for energizing the display 36 to display the amount of credit currently available for selection or refund, which may be in terms either of numbers of credit units of predetermined value or in monetary units in accordance with a selected monetary system. In one practical and preferred embodiment the display may include means for indicating that the credit available in the machine is insufficient for the article selected, or is insufficient for a refund or for change. Conveniently, the control signals on lines 22 are provided in predetermined fashion by the control circuit 44 so as to energize article dispensing or refund or change dispensing means 16 only when sufficient credit is available for the purchase of the selected article or for the dispensing of a change or refund.

As will be more fully disclosed later herein, the encoding circuit 40 and control circuit 44 are advantageously adjustable or "programmable" for accommodating a wide variety of articles to be dispensed at different prices, as well as a wide variety of different denominations or values of monetary units (i.e. coins or bills) deposited at the money accepting means 12. Moreover, the encoding circuit 40 and control circuit 44 are further readily adjustable or "programmable" by the user to accommodate changes in the prices, identity or number of articles to be dispensed, as well as changes in the denominations of monetary units to be accepted and also for changes in the monetary system to be accommodated (i.e., for coins and/or bills of different countries).

Figure 2A:
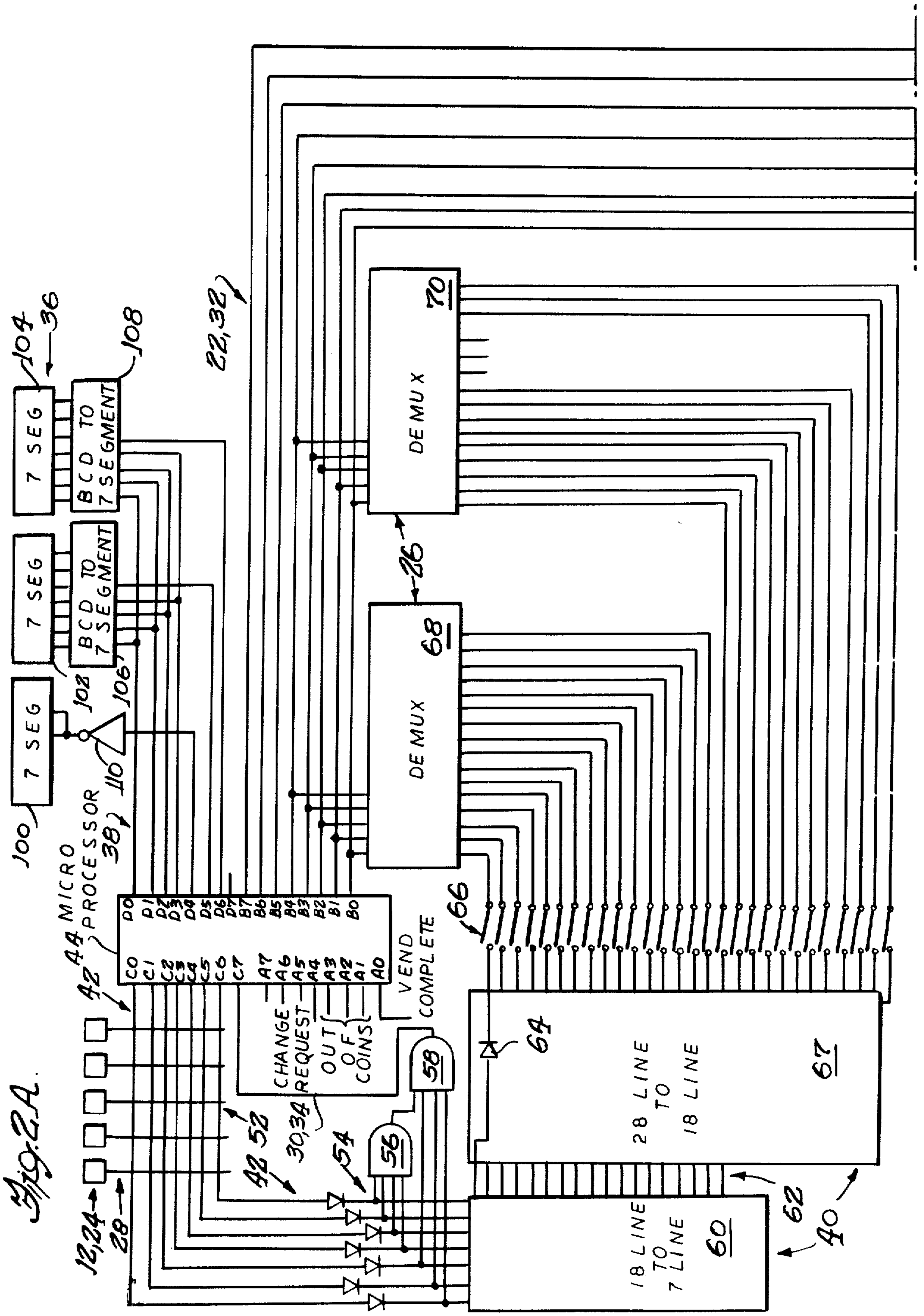

Reference is next invited to FIGS. 2A and 2B, wherein one embodiment of the novel control system of FIG. 1 is illustrated in circuit schematic form, revealing additional detail thereof. As mentioned above, the coin or bill inputs 12 are of conventional nature and need not be illustrated or described further herein. In the illustrated embodiment, these inputs 12 are five in number and include the associated money input circuits 24 which feed lines 28 to a matrix array designated generally 52 and comprising a portion of the encoding circuit 40 of the invention. The matrix array 52 is defined by the crossings of these lines 28 with the lines 42 feeding control circuit 44. The lines 42 are seven in number in the illustrated embodiment. Suitable diodes may be utilized to cross-connect the lines 28 with selected ones of the lines 42 to form a seven-bit code representing the monetary value of the coin or bill accepted at each input 12, 24. It will be noted that the lines 42 are also each fed via one of a plurality of diodes designated generally 54 to the inputs of a pair of four-input AND gates 56 and 58.

These AND gates 56 and 58 are arranged to feed a single output line which forms both of control lines 30 and 34 of the block diagram of FIG. 1, feeding the control circuit 44. In operation, the acceptance of any coin or bill will cause a positive or logic "1" signal on the control line 30, 34, thereby indicating to the control circuit 44 that a coin or bill has been deposited and accepted. Conversely, as will be more fully seen later the actuation of a selection or refund/change request switch will cause an opposite sense signal or logic "0" to appear on the line 30, 34, thus indicating to control circuit 44 that a selection switch or the refund request control has been actuated. Accordingly, the control circuit 44 determines whether to add to or subtract from the credit available for purchase or refund, by the sense of the logic signal received on the control line 30, 34.

The remainder of encoding circuit 40 comprises a seven-by-eighteen line matrix 60, which is formed by the seven lines at the outputs of diodes 54 and eighteen lines designated generally 62. These eighteen lines 62 are selectively connectable, preferably by a suitable diode such as the diode 64, with one or more of 28 single-pole, single-throw (SPST) switches designated generally 66 which comprise the article select/refund request means 14. Thus circuit block 67 forms a 28 line-to-18 line decoder. In the illustrated embodiment, 25 selection switches are provided while the remaining three switches 66 comprise refund or change request switches, for requesting change in any of three possible coin or bill denominations. Other arrangements and numbers of such selections and refund request switches could readily be provided, the foregoing being merely exemplary.

In accordance with a feature of the invention, the control circuit 44 comprises a microprocessor, which in the illustrated embodiment is of the type generally designated PIC 1650 and available from the General Instrument Company, Hicksville, Long Island, N.Y. The microprocessor 44 includes four 8-bit ports, designated by respective reference letters A,B,C and D each followed by one of the numerals 0 through 7, indicating the least significant through most significant bits of the port. It will be seen that the bits of the C port receive the lines 42, which carry the seven-bit pricing or value information or code corresponding either to the values of coins or bills deposited and accepted at the inputs 12 or to the prices of articles selected or value of the refund requested at the selection switches 64. The eighth bit C7 of the C port receives the control line 30, 34 indicating whether the signals at the remaining bits of the C port represent the price/value of an article/-refund request or the value of a coin or bill deposited.

The B port of microprocessor 44 scans the lines 22, 32 which feed the selection input circuits 26 and the dispenser enabling circuits 18, which are seen in FIG. 2B. These selection input circuits 26, in the embodiment of FIGS. 2A and 2B, comprise a pair of one-of-sixteen demultiplexer circuits 68, 70, which receive their control or clock inputs from the five least significant bits, B0 through B4 inclusive, of the B port. The outputs of these demultiplexers are coupled to the respective switches 66 as illustrated.

Referring to FIG. 2B, the eight lines 22, 32 from the B port of microprocessor 34 feed control inputs of a pair of BCD-to-decimal decoder/drivers 72, 74, and three inverters, generally designated 76. Eight output lines of the decoder/driver 72 feed the inputs of eight driver circuits 78 via eight corresponding inverters designated generally 80. The drivers 78 are preferably in the form of an integrated circuit, either type DM 8863 or XR 220, which are integrated circuit packages containing eight 500 milliamp drivers. The BCD-to-decimal decoder/driver 74 feeds four driver circuits designated generally 82, which will be described in further detail hereinbelow. The eight outputs of the driver circuits 78 and the four outputs of the driver circuits 82 form an eight-by-four matrix array 81, suitable for selecting one of 32 electromechanical dispensers, such as exemplary motor (M) 84, interconnected between line crossings of the matrix. The three inverters 76, in the illustrated embodiment feed three control lines for energizing the display to indicate the user may select an article to be vended ("select"), to indicate "insufficient credit" for selection of an article or for refund, and to indicate that the vending machine is "out of change".

Figure 3:
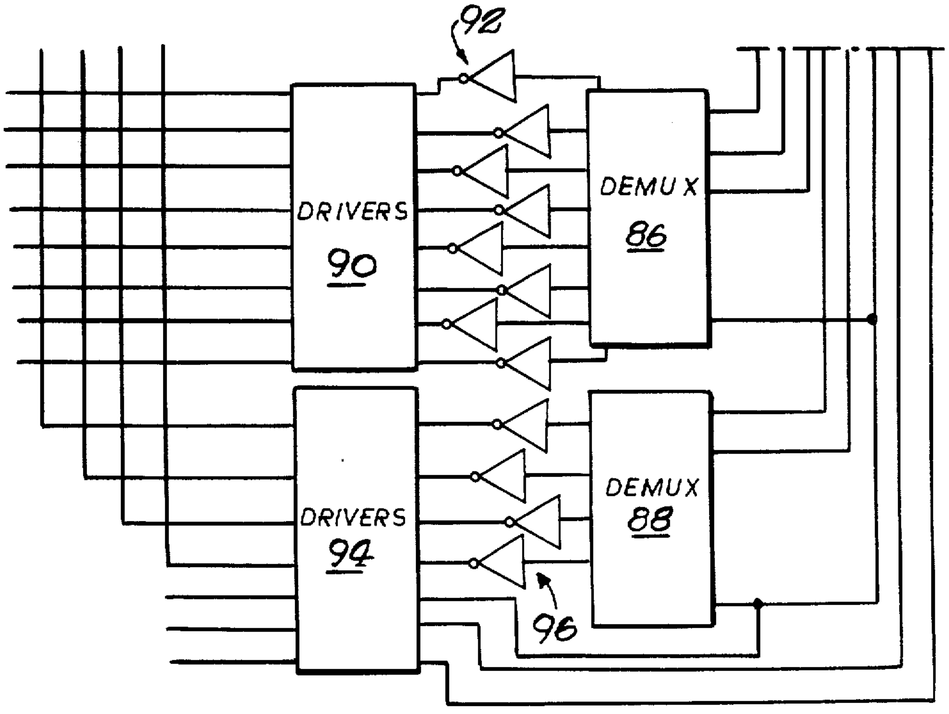
FIG. 3 is a circuit schematic diagram of an alternate form of a portion of the embodiment of FIGS. 2A and 2B.

Referring to FIG. 3, an alternate embodiment of the dispenser/enable circuits 18 of FIG. 1 is illustrated. In this alternate embodiment the eight lines 22, 32 feed a three-line-to eight-line demultiplexer circuit 86 and a two-line-to-four line demultiplexer circuit 88. The eight outputs of the multiplexer 86 feed the inputs of eight corresponding 500 milliampere driver circuits 90 via eight corresponding inverters, designated generally 92. The demultiplexer circuit 98 feeds the first four of eight similar 500 milliampere driver circuits 94 via four similar inverters designated generally 96. Three remaining ones of the drivers 94 are fed directly from the three most significant bits of the B port, via the lines 22, 32. The eight outputs of the drivers 90 and the first four outputs of the drivers 94 form an eight-by-four-matrix. This matrix, like the similar matrix described with reference to FIG. 2B may energize up to 32 suitable motors or solenoids for vending articles from the machine or for releasing suitable coins in response to a request for refund or change. The last three outputs of the drivers 94 are the same as those described in FIG. 2B with reference to the inverters 76.

In the illustrated embodiment, the demultiplexer circuits 68 and 70 are of the type generally designated 74154, the demultiplexer circuits 86 and 88 are of the type generally designated 75155, the BCD-to-decimal decoder/driver circuits 72 and 74 are of the type generally designated 7445, and the driver circuits 78, 90 and 94 of the type generally designated DM 8863 or alternatively XR 220.

Referring again to FIG. 2A, in the illustrated embodiment the display 36 comprises three conventional seven-segment LED display elements 100, 102 and 104. The seven-segment displays 102 and 104 are driven by BCD-to-seven-segment driver/latches 106 and 108, which are in turn driven from the D port of the microprocessor 44. The remaining seven-segment display 100 is utilized to display either a one or zero as the most significant digit of the display 36, and thus is driven only from the D4 bit of the D port of microprocessor 44, via a suitable inverter 110. Briefly, in the embodiment illustrated in FIG. 2A, the three display elements are utilized to display the number of available credits in the system, rather than absolute monetary value. This feature may be readily varied without departing from the invention as will be seen with reference to the later figures.

The A port of the microprocessor 44 is utilized for signal inputs corresponding to other functions of the typical vending machine 10. Specifically, the A0 port receives a suitable signal from the vending motors or other electromechanical vending devices indicating that an article has been vended or that the vend is "complete" (Vend Complete). The A1, A2, and A3 ports are tied to suitable sensors associated with coin storage devices of the vending machine, to receive a suitable signal when one or more of these coin storage devices is empty or out of coins. The A4 port is used to receive the signal indicating that the change or refund request selection switch or other referred selection means has been actuated.

Figure 4:
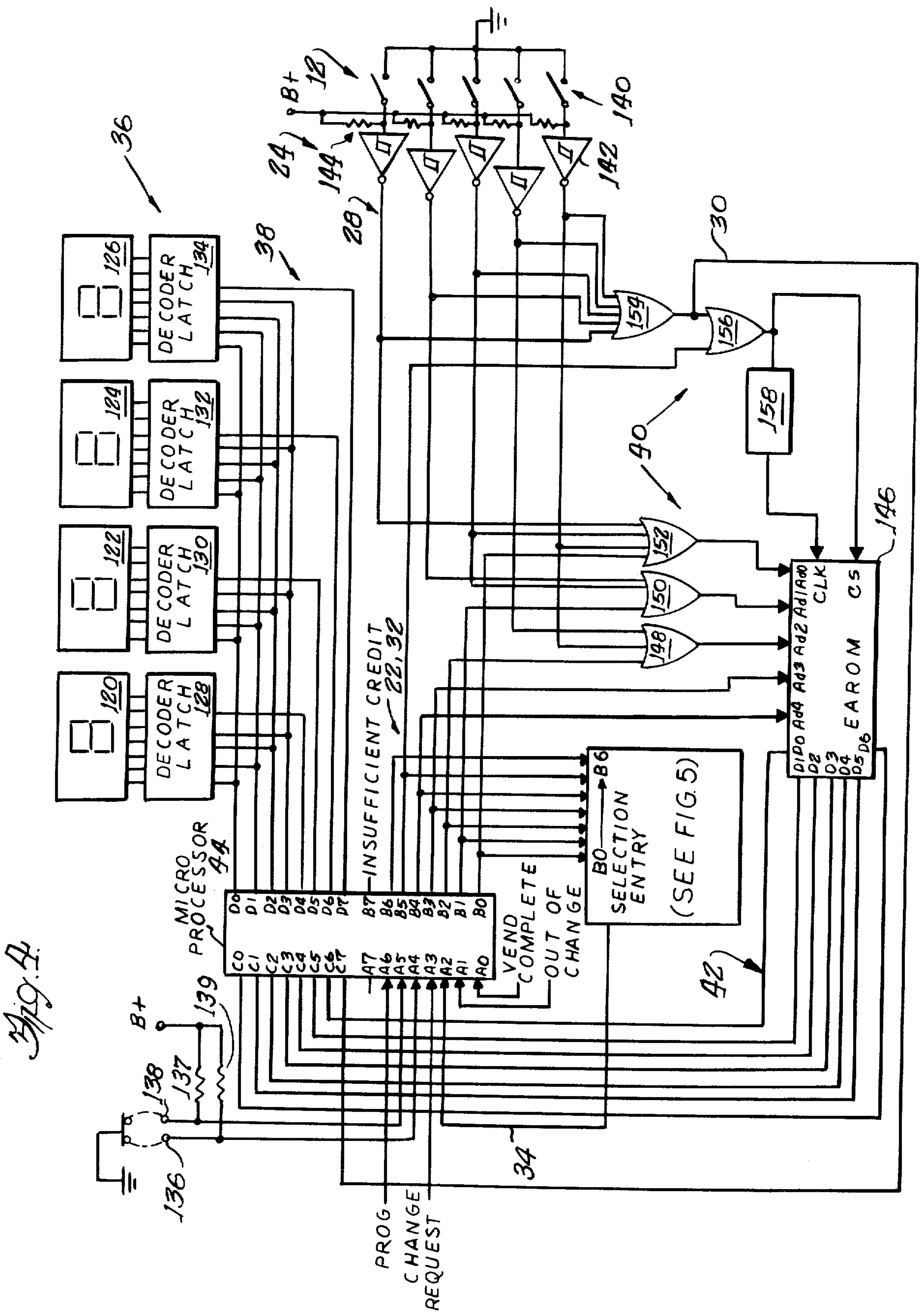
FIG. 4 is a circuit diagram, partially in block form, of a second embodiment of a control system in accordance with the present invention.

Reference is next invited to FIG. 4, wherein a second embodiment of the control system of the invention is illustrated. The control circuit 44 comprises a microprocessor, also of the type generally designated PIC1650 as utilized in the embodiment of FIGS. 2A and 2B. The microprocessor 44 includes four eight-bit ports, designated A,B,C and D, with bit numbers assigned in the same fashion as the embodiment of FIG. 2A.

The display 36 in the embodiment of FIG. 4 comprises four, seven-segment LED elements 120, 122, 124 and 126, each driven by a BCD-to-7-segment decoder latch 128, 130, 132, and 134. In the illustrated embodiment these BCD-to-7-segment decoder latch/circuits comprise integrated circuits of the type generally designated CD4511. The decoder/latch circuits 128 through 134 are driven from the for least significant bits (D0, D1, D2, D3) of the D port of microprocessor 44, the latch control terminal of each being driven from one of the four most significant bits D4, D5, D6 and D7, respectively. Thus, the display is capable for providing a four place indication of credit available in monetary units in many different monetary systems.

The monetary system utilized, as well as the relative values of different denomination coins to be utilized in the vending machine may readily be accommodated by use of a pair of "programming" terminals 136, 138 at the upper left-hand portion of FIG. 4. A suitable positive supply voltage (B+) is fed via a pair of resistors 137, 139 to the A4 and A5 bits of the A port of microprocessor 44. Selective jumpering of one, both, or neither, of the terminals 136 and 138 to ground, as indicated in dashed line, will result in one of four possible two-bit logic signals at the bits A4, A5, which are decoded as "Credit Multipliers" by microprocessor 44 as shown in Table 1 below.

TABLE 1

| 136,138 | CREDIT MULTIPLIER |
|---|---|
| 0, 0 | 1 |
| 1, 0 | 2 |
| 0, 1 | 4 |
| 1, 1 | 5 |

Accordingly, if the basic price or "Credit Multiplier" in the table above is chosen as five, a five cent piece, or "nickel" in the U.S. monetary system, would count as a single credit unit for purposes of internal computation. However, this single credit unit is multiplied by five by the microprocessor 44, immediately prior to display thereof on the display 36, thereby converting to a "dollars and cents" or actual monetary value for readout on display 36.

The coin or bill inputs 12 are illustrated at the right hand side of FIG. 4 as five single-pole, single-throw switches designated generally 140. Each switch 140 is actuated by the acceptance of a corresponding denomination coin or bill by the vending machine. Each of these switches 140 drives a corresponding one of five Schmitt trigger circuits, designated generally 142, which comprise the money inut circuits 24. A suitable pull-up resistor, designated generally 144 is provided to a positive supply (B+) at the input of each Schmitt trigger 142. The outputs of the Schmitt triggers feed the lines 28 to the encoding circuit 40. In the embodiment of FIG. 4, the encoding circuit 40 comprises an electronic memory element 146. In a preferred form of the invention, the memory 146 is an electrically alterable read only memory (EAROM) of the type generally designated 2051. This EAROM 146 has address inputs Ad0, Ad1 and Ad2 addressed from the lines 28 via intervening logic elements comrising two three-input OR gates 148, 150, and a four-input OR gate 152. A five-input OR gate 154 and a two-input OR gate 156 which feeds a one-shot circuit 158 feed CLK and CS inputs of the EAROM 146. The five-inputs of the OR gate 154 are fed from respective lines 28, while selected inputs of the OR gates 148, 150 and 152 are fed from respective ones of the lines 28 as illustrated. The OR gate 154 feeds one input of the OR gate 156, so that the one-shot 158 provides a delay to the clock input of EAROM 146 upon the deposit of each coin or other monetary unit to produce a switch debounce. In the illustrated embodiment this one-shot 158 is set for a 20 microsecond delay.

The remaining inputs of the OR gates 148, 150 and 152 are fed respectively from the B2, B1 and B0 bits of the B port of microprocessor 44, via the lines generally designated 22, 32. The B3 and B4 bits of microprocessor 44 feed remaining address inputs A3 and A4 of EAROM 146. The data outputs of EAROM 146 are designated D0 through D6, respectively, indicating least significant through most significant bits thereof (not to be confused with the D port of microprocessor 44). These data outputs of EAROM 146 feed the C0 through C6 bits of the C port of microprocessor 44, in the same order, least significant bit to most significant bit. The C7 port is fed directly from the output of OR gate 154, which forms the control signal line 30. This latter signal, when at logic "1" or "high", indicates to the microprocessor 44 that a coin or other monetary unit is being deposited and therefore the signals from EAROM 146 represent credit to be added. Conversely, when the opposite sense signal is present on the line 30, it indicates selection of an article or of a refund/change, therefore the credits from EAROM 146 are to be subtracted. Advantageously, EAROM 146 is readily alterable to change either the relative values of coins or bills to be accepted by the vending machine or prices of articles to be vended. As will be more fully explained later, the addressing of EAROM by the B port microprocessor 44 results in the price of a selected article being fed thereby to the C port of microprocessor 44. The remaining portions of the selection and dispensing control circuits are seen in FIG. 5.

Referring now to FIG. 5, the bits of the B port in microprocessor 44 feed the illustrated circuits. Specifically, the B3, B4 and B5 bits feed a multiplexer 170, the B0, B1, B2 and B5 bits feed a decoder/driver 172 and the B3, B4 and B6 bits feed a decoder/driver 174. In the illustrated embodiment, the decoder/drivers 172 and 174 comprise BCD-to-decimal decoder/driver integrated circuits of the type generally designated 7445, while the multiplexer 170 comprises a multiplexer integrated circuit of the type generally designated 74151. The output of multiplexer 170 comprises the "selection enter" line 34, which feeds the A2 bit of microprocessor 44 as illustrated in FIG. 4.

Four outputs of multiplexer 170 and eight outputs of decoder/driver 172 are selected to form a four-by-eight matrix array 176 which accommodates the selection switches of the vending machine. Specifically, each of the outputs of multiplexer 170 is provided with a suitable pull up resistor designated generally 177, to a positive supply voltage (B+). The selection switches are then interposed at the crossover points of the matrix 176. These same eight outputs of decoder/driver 172 also feed the inputs of eight driver circuits 178, via eight suitable inverters 180. The eight outputs of these drivers 178, together with four outputs of the decoder/driver circuit 174, form a second eight-by-four matrix array 181. The four outputs of decoder/driver 174 are fed to the matrix 181 via respective intervening driver circuits designated generally 182. Accordingly, the motors or other electromechanical devices for dispensing articles or change are interposed at the crossover points of the matrix as indicated by a typical one of such devices 184.

In operation, the B port of a microprocessor 44 scans the matrix 176 of selection switches via the decoder/driver 172 and multiplexer 170. The EAROM is simultaneously addressed in synchronization with matrix 176 by the same B port. Thus, when a closed one of the selection switches is encountered, a suitable signal will be given on the line 34 to the microprocessor 44 to enter the corresponding price code from EAROM 146.

Referring briefly to FIG. 6, a typical driver circuit, for use as the drivers 82 of FIG. 2B and as the drivers 182 of FIG. 5 is illustrated. This circuit comrises a PNP transistor 190, whose emitter electrode is tied to a positive voltage supply (B+). The base electrode of transistor 190 is tied to its emitter electrode via a suitable resistor 192 and receives the input (i.e. from decoder/-driver 74 or 174) via a resistor 194. The collector electrode of transistor 190 feeds the output terminal (i.e. to matrix 81 or 181) of the driver circuit and is tied to the anode of a diode 196 and to the cathode of a diode 198, the opposite electrodes of diodes 196 and 198 being tied to the positive voltage supply (B+) and to ground respectively.

Having described two embodiments and salient features of the operation thereof, some additional description of the operation of the embodiment of FIGS. 2A and 2B and of the embodiment of FIGS. 4 and 5 will be helpful. In both embodiments the microprocessor 44 is programmed to operate in terms of credit units, which may correspond in any desired fashion with the actual cash value of monetary units (coins or bills) accepted by the vending machine. The seven-bit encoding of the monetary unit inputs on the lines 42 enables the acceptance of any coin or bill having a credit value of between one and 127 basic credit units. This basic credit unit may, for example, be chosen for the value of the smallest coin denomination to be utilized, e.g., if five cents (in United States currency) is designated one credit, then a ten cent piece would equal two credits, a twenty-five cent piece would equal five credits and so forth. Alternatively, should a one cent piece be chosen to one credit then a five cent piece would be five credits and ten cent piece ten credits and so forth. Similarly, since these same seven lines 42 also carry encoded prices of available articles, each article may have a price anywhere in the range from one to 127 times the basic credit unit.

In the embodiment of FIGS. 2A and 2B, the provision of eighteen lines in the matrix 60 provides eighteen possible prices or credit levels for the available articles and for available coin denominations for change or refund purposes. Thus, each of these eighteen lines could be tied to the lines 42 so as to set any price or credit level in the range of zero to 127 basic credit units. Advantageously, the coin return or refunds are therefore treated in exactly the same fashion as selection of articles to be vended, thereby simplifying the circuits. Accordingly, the display 36 illustrated in FIG. 2A is suitable for displaying a three-digit indication of the accumulated or available credit. Advantageously, the provision of this credit-setting seven-bit inut at lines 42 together with the control line 30, 34, simplifies the circuits in that either the vending of a selected item or the acceptance of coin or bill is handled by the microprocessor on the same C port. The state of the C7 bit indicates whether the other bits are credit to be added to the system due to deposit of monetary units, or credit to be substracted due to the vending of a selected article, the completion of the vend cycle being indicated by the state of the A0 bit.

In the embodiment of FIGS. 4 and 5, the system is quite similar to that of FIGS. 2A and 2B in its basic operation. While the handling of credit in microprocessor 44 and EAROM 146 is still in terms of credit units as described above, the provision of the terminals 136 and 138 make possible decoding of these credit units into actual cash values for purposes of readout on the display 36. In similar fashion to the first embodiment, the C port of the microprocessor 44 in FIG. 4 is utilized as the credit input, both for values of bills or coins accepted and for prices of articles or refund/change selected.

Additionally, the B ports are utilized both for selection of articles to be vended and for enabling of the mechanisms for actual vending thereof. It will be appreciated in this regard that in both systems the microprocessor is suitably programmed to compare the prices of selected articles and/or a request for a refund/-change with available credit, and enable or disable the dispensing of selected articles or of a refund/change accordingly.

In the embodiment illustrated in FIG. 4, the first 5 words of EAROM 146 are utilized to store the credit values of the five available coin or bill inputs 12, while words six through thirty are utilized to store prices of articles to be vended. Cooperatively, the B ports of microprocessor 44 are incremented only from counts 6 to 30, in order to address the proper words of EAROM 146 in synchronization with the scanning of the selection switches of FIG. 5, as discussed above. It will be noted that the "vend complete" and "out of change" signals feeds bits A0 through A1 of microprocessor 44 in FIG. 4 and are derived from suitable sensors as discussed above with reference to the embodiment of FIGS. 2A and 2B. Also, the B7 port is utilized to output an "insufficient credit" signal for driving a suitable observable indicator or display element (not shown) when insufficient credit is available for the selection or change/refund requested.

An exemplary program for the microprocessor 44 is reproduced on the following pages.

| | | |
|---|---|---|
| 000 | 001 000 001 110 | 1016 |
| 001 | 000 000 101 000 | 0050 |
| 002 | 100 000 000 000 | 4000 |
| 003 | 100 100 111 001 | 4471 |
| 004 | 011 100 000 101 | 3405 |
| 005 | 101 000 010 000 | 5020 |
| 006 | 110 010 000 000 | 6200 |
| 007 | 100 100 110 010 | 4462 |
| 010 | 011 100 000 101 | 3405 |
| 011 | 101 000 010 000 | 5020 |
| 012 | 110 011 111 111 | 6377 |
| 013 | 000 000 100 101 | 0045 |
| 014 | 110 011 100 111 | 6347 |
| 015 | 000 000 101 000 | 0050 |
| 016 | 010 000 000 011 | 2003 |
| 017 | 100 000 000 000 | 4000 |
| 020 | 110 000 001 000 | 6010 |
| 021 | 100 111 011 000 | 4730 |
| 022 | 011 000 000 011 | 3003 |
| 023 | 101 000 000 100 | 5004 |
| 024 | 010 111 100 101 | 2745 |
| 025 | 101 110 110 001 | 5661 |
| 026 | 110 011 100 100 | 6344 |
| 027 | 000 000 101 000 | 0050 |
| 030 | 010 000 000 110 | 2006 |
| 031 | 010 011 100 101 | 2345 |
| 032 | 100 100 111 001 | 4471 |
| 033 | 110 011 111 010 | 6372 |
| 034 | 100 100 110 010 | 4462 |
| 035 | 010 100 000 110 | 2406 |
| 036 | 011 100 000 101 | 3405 |
| 037 | 101 000 100 110 | 5046 |
| 040 | 110 000 000 010 | 6002 |
| 041 | 100 111 011 000 | 4730 |
| 042 | 011 100 000 011 | 3403 |
| 043 | 101 000 010 100 | 5024 |
| 044 | 100 100 111 101 | 4475 |
| 045 | 101 000 011 101 | 5035 |
| 046 | 100 100 110 001 | 4461 |
| 047 | 011 100 000 101 | 3405 |
| 050 | 101 000 000 011 | 5003 |
| 051 | 101 000 100 000 | 5040 |
| 052 | 000 000 110 000 | 0060 |
| 053 | 001 000 010 000 | 1020 |
| 054 | 100 111 011 000 | 4730 |
| 055 | 011 100 000 011 | 3403 |
| 056 | 101 000 001 111 | 5017 |
| 057 | 100 100 111 101 | 4475 |
| 060 | 101 000 101 011 | 5053 |
| 061 | 110 000 001 000 | 6010 |
| 062 | 000 111 000 001 | 0701 |
| 063 | 000 000 110 000 | 0060 |
| 064 | 001 000 010 000 | 1020 |
| 065 | 000 010 000 001 | 0201 |
| 066 | 011 001 000 011 | 3103 |
| 067 | 101 000 001 111 | 5017 |
| 070 | 101 000 110 100 | 5064 |
| 071 | 000 001 100 001 | 0141 |
| 072 | 000 001 110 010 | 0162 |
| 073 | 000 001 110 100 | 0164 |
| 074 | 100 000 000 000 | 4000 |
| 075 | 110 000 000 101 | 6005 |
| 076 | 000 111 000 001 | 0701 |

| | | | | | |
|---|---|---|---|---|---|
| 077 | 011 | 100 | 000 | 011 | 3403 |
| 100 | 101 | 000 | 111 | 011 | 5073 |
| 101 | 001 | 000 | 110 | 100 | 1064 |
| 102 | 011 | 101 | 000 | 011 | 3503 |
| 103 | 101 | 000 | 001 | 111 | 5017 |
| 104 | 001 | 010 | 110 | 010 | 1262 |
| 105 | 001 | 001 | 110 | 100 | 1164 |
| 106 | 100 | 000 | 000 | 000 | 4000 |
| 107 | 010 | 110 | 001 | 000 | 2610 |
| 110 | 010 | 110 | 101 | 000 | 2650 |
| 111 | 010 | 111 | 001 | 000 | 2710 |
| 112 | 010 | 011 | 101 | 000 | 2350 |
| 113 | 010 | 100 | 011 | 101 | 2435 |
| 114 | 010 | 100 | 011 | 101 | 2435 |
| 115 | 010 | 111 | 101 | 000 | 2750 |
| 116 | 010 | 010 | 001 | 000 | 2210 |
| 117 | 010 | 100 | 000 | 011 | 2403 |
| 120 | 100 | 000 | 000 | 000 | 4000 |
| 121 | 010 | 001 | 000 | 110 | 2106 |
| 122 | 010 | 110 | 100 | 110 | 2646 |
| 123 | 010 | 100 | 011 | 101 | 2435 |
| 124 | 010 | 010 | 100 | 110 | 2246 |
| 125 | 110 | 000 | 000 | 001 | 6001 |
| 126 | 100 | 100 | 110 | 010 | 4462 |
| 127 | 001 | 001 | 000 | 111 | 1107 |
| 130 | 000 | 000 | 111 | 100 | 0074 |
| 131 | 010 | 101 | 000 | 110 | 2506 |
| 132 | 010 | 000 | 000 | 011 | 2003 |
| 133 | 100 | 000 | 000 | 000 | 4000 |
| 134 | 010 | 010 | 101 | 000 | 2250 |
| 135 | 010 | 111 | 001 | 000 | 2710 |
| 136 | 010 | 010 | 001 | 000 | 2210 |
| 137 | 101 | 001 | 001 | 010 | 5112 |
| 140 | 110 | 000 | 010 | 101 | 6025 |
| 141 | 000 | 000 | 101 | 111 | 0057 |
| 142 | 001 | 000 | 001 | 100 | 1014 |
| 143 | 000 | 000 | 110 | 000 | 0060 |
| 144 | 000 | 001 | 111 | 110 | 0176 |
| 145 | 000 | 001 | 111 | 111 | 0177 |
| 146 | 000 | 001 | 110 | 101 | 0165 |
| 147 | 000 | 001 | 110 | 110 | 0166 |
| 150 | 000 | 001 | 110 | 111 | 0167 |
| 151 | 000 | 001 | 111 | 000 | 0170 |
| 152 | 001 | 000 | 001 | 001 | 1011 |
| 153 | 000 | 111 | 111 | 111 | 0777 |
| 154 | 011 | 000 | 000 | 011 | 3003 |
| 155 | 001 | 010 | 111 | 110 | 1276 |
| 156 | 001 | 011 | 110 | 000 | 1360 |
| 157 | 101 | 001 | 101 | 011 | 5153 |
| 160 | 001 | 000 | 111 | 111 | 1077 |
| 161 | 011 | 001 | 000 | 011 | 3103 |
| 162 | 101 | 010 | 000 | 000 | 5200 |
| 163 | 000 | 011 | 111 | 111 | 0377 |
| 164 | 001 | 000 | 001 | 111 | 1017 |
| 165 | 000 | 000 | 100 | 100 | 0044 |
| 166 | 001 | 010 | 100 | 000 | 1240 |
| 167 | 100 | 110 | 010 | 101 | 4625 |
| 170 | 100 | 110 | 010 | 101 | 4625 |
| 171 | 100 | 110 | 010 | 101 | 4625 |
| 172 | 011 | 100 | 100 | 101 | 3445 |
| 173 | 101 | 001 | 111 | 110 | 5176 |
| 174 | 011 | 101 | 100 | 101 | 3545 |
| 175 | 101 | 010 | 010 | 001 | 5221 |
| 176 | 100 | 100 | 111 | 101 | 4475 |
| 177 | 101 | 001 | 110 | 000 | 5160 |

| | | |
|---|---|---|
| 200 | 001 000 111 110 | 1076 |
| 201 | 011 001 000 011 | 3103 |
| 202 | 101 010 000 110 | 5206 |
| 203 | 000 011 111 110 | 0376 |
| 204 | 001 001 111 111 | 1177 |
| 205 | 101 001 110 100 | 5164 |
| 206 | 110 000 011 000 | 6030 |
| 207 | 000 000 100 100 | 0044 |
| 210 | 110 000 000 011 | 6003 |
| 211 | 000 000 110 000 | 0060 |
| 212 | 001 110 010 000 | 1620 |
| 213 | 000 100 100 000 | 0440 |
| 214 | 000 011 100 100 | 0344 |
| 215 | 000 011 110 000 | 0360 |
| 216 | 011 011 110 000 | 3360 |
| 217 | 101 001 011 010 | 5132 |
| 220 | 101 010 001 010 | 5212 |
| 221 | 100 100 110 001 | 4461 |
| 222 | 011 001 100 101 | 3145 |
| 223 | 101 001 111 110 | 5176 |
| 224 | 101 001 001 111 | 5117 |
| 225 | 110 000 001 010 | 6012 |
| 226 | 000 010 000 000 | 0200 |
| 227 | 011 101 000 011 | 3503 |
| 230 | 101 010 011 101 | 5235 |
| 231 | 000 001 100 000 | 0140 |
| 232 | 001 010 100 100 | 1244 |
| 233 | 001 010 100 000 | 1240 |
| 234 | 100 000 000 000 | 4000 |
| 235 | 001 010 100 100 | 1244 |
| 236 | 100 000 000 000 | 4000 |
| 237 | 110 000 000 100 | 6004 |
| 240 | 000 000 111 110 | 0076 |
| 241 | 001 000 011 001 | 1031 |
| 242 | 000 000 100 100 | 0044 |
| 243 | 010 111 111 101 | 2775 |
| 244 | 001 000 000 000 | 1000 |
| 245 | 000 000 101 000 | 0050 |
| 246 | 110 000 000 001 | 6001 |
| 247 | 100 100 110 010 | 4462 |
| 250 | 011 010 000 101 | 3205 |
| 251 | 101 010 110 111 | 5267 |
| 252 | 110 000 000 010 | 6002 |
| 253 | 100 100 110 010 | 4462 |
| 254 | 011 010 000 101 | 3205 |
| 255 | 101 010 111 001 | 5271 |
| 256 | 010 000 100 110 | 2046 |
| 257 | 010 100 011 101 | 2435 |
| 260 | 010 100 011 101 | 2435 |
| 261 | 001 001 000 111 | 1107 |
| 262 | 110 110 000 000 | 6600 |
| 263 | 000 000 101 110 | 0056 |
| 264 | 010 100 100 110 | 2446 |
| 265 | 010 011 111 101 | 2375 |
| 266 | 101 010 111 001 | 5271 |
| 267 | 110 000 000 010 | 6002 |
| 270 | 100 100 110 010 | 4462 |
| 271 | 110 011 100 111 | 6347 |
| 272 | 000 000 101 000 | 0050 |
| 273 | 001 010 111 001 | 1271 |
| 274 | 110 000 011 001 | 6031 |
| 275 | 000 010 011 001 | 0231 |
| 276 | 011 101 000 011 | 3503 |
| 277 | 101 011 000 010 | 5302 |
| 300 | 110 000 010 101 | 6025 |

| | | | | | |
|---|---|---|---|---|---|
| 301 | 000 | 000 | 111 | 001 | 0071 |
| 302 | 001 | 011 | 111 | 110 | 1376 |
| 303 | 101 | 010 | 100 | 001 | 5241 |
| 304 | 100 | 000 | 000 | 000 | 4000 |
| 305 | 011 | 011 | 111 | 101 | 3375 |
| 306 | 101 | 001 | 000 | 111 | 5107 |
| 307 | 100 | 100 | 111 | 101 | 4475 |
| 310 | 110 | 000 | 010 | 011 | 6023 |
| 311 | 100 | 111 | 011 | 000 | 4730 |
| 312 | 011 | 000 | 000 | 011 | 3003 |
| 313 | 101 | 001 | 011 | 010 | 5132 |
| 314 | 100 | 101 | 011 | 100 | 4534 |
| 315 | 101 | 000 | 010 | 110 | 5026 |
| 316 | 000 | 000 | 111 | 010 | 0072 |
| 317 | 001 | 000 | 111 | 011 | 1073 |
| 320 | 011 | 001 | 000 | 011 | 3103 |
| 321 | 101 | 001 | 001 | 111 | 5117 |
| 322 | 001 | 000 | 111 | 010 | 1072 |
| 323 | 011 | 001 | 000 | 011 | 3103 |
| 324 | 101 | 001 | 011 | 010 | 5132 |
| 325 | 000 | 011 | 111 | 010 | 0372 |
| 326 | 000 | 011 | 111 | 011 | 0373 |
| 327 | 101 | 011 | 001 | 111 | 5317 |
| 330 | 000 | 000 | 111 | 010 | 0072 |
| 331 | 001 | 000 | 010 | 010 | 1022 |
| 332 | 000 | 000 | 111 | 011 | 0073 |
| 333 | 101 | 011 | 001 | 111 | 5317 |
| 334 | 100 | 101 | 011 | 100 | 4534 |
| 335 | 100 | 100 | 010 | 110 | 4426 |
| 336 | 101 | 011 | 100 | 100 | 5344 |
| 337 | 100 | 101 | 011 | 100 | 4534 |
| 340 | 110 | 000 | 011 | 001 | 6031 |
| 341 | 100 | 100 | 110 | 010 | 4462 |
| 342 | 101 | 100 | 000 | 000 | 5400 |
| 343 | 100 | 101 | 000 | 111 | 4507 |
| 344 | 110 | 000 | 010 | 101 | 6025 |
| 345 | 000 | 000 | 111 | 001 | 0071 |
| 346 | 110 | 011 | 001 | 111 | 6317 |
| 347 | 000 | 000 | 100 | 110 | 0046 |
| 350 | 110 | 011 | 100 | 101 | 6345 |
| 351 | 000 | 000 | 101 | 000 | 0050 |
| 352 | 000 | 001 | 101 | 001 | 0151 |
| 353 | 000 | 001 | 101 | 010 | 0152 |
| 354 | 000 | 001 | 101 | 011 | 0153 |
| 355 | 100 | 101 | 010 | 001 | 4521 |
| 356 | 001 | 000 | 011 | 100 | 1034 |
| 357 | 000 | 000 | 101 | 100 | 0054 |
| 360 | 110 | 011 | 100 | 111 | 6347 |
| 361 | 000 | 000 | 101 | 000 | 0050 |
| 362 | 100 | 101 | 100 | 000 | 4540 |
| 363 | 010 | 011 | 100 | 110 | 2346 |
| 364 | 110 | 000 | 001 | 001 | 6011 |
| 365 | 100 | 100 | 101 | 010 | 4452 |
| 366 | 010 | 111 | 100 | 110 | 2746 |
| 367 | 001 | 000 | 001 | 001 | 1011 |
| 370 | 000 | 100 | 001 | 010 | 0412 |
| 371 | 000 | 100 | 001 | 011 | 0413 |
| 372 | 011 | 101 | 000 | 011 | 3503 |
| 373 | 101 | 011 | 011 | 100 | 5334 |
| 374 | 011 | 111 | 101 | 000 | 3750 |
| 375 | 101 | 011 | 011 | 100 | 5334 |
| 376 | 100 | 101 | 000 | 111 | 4507 |
| 377 | 100 | 100 | 000 | 011 | 4403 |
| 400 | 011 | 010 | 100 | 101 | 3245 |
| 401 | 011 | 100 | 000 | 101 | 3405 |

| | | |
|---|---|---|
| 402 | 101 011 011 111 | 5337 |
| 403 | 100 101 000 111 | 4507 |
| 404 | 011 000 100 101 | 3045 |
| 405 | 101 100 001 001 | 5411 |
| 406 | 100 100 110 001 | 4461 |
| 407 | 011 100 100 101 | 3445 |
| 410 | 101 110 110 100 | 5664 |
| 411 | 011 001 100 101 | 3145 |
| 412 | 101 100 100 100 | 5444 |
| 413 | 100 100 110 001 | 4461 |
| 414 | 011 001 100 101 | 3145 |
| 415 | 101 100 001 001 | 5411 |
| 416 | 100 100 111 001 | 4471 |
| 417 | 100 101 010 001 | 4521 |
| 420 | 001 000 011 100 | 1034 |
| 421 | 000 111 101 011 | 0753 |
| 422 | 011 100 000 011 | 3403 |
| 423 | 101 100 010 110 | 5426 |
| 424 | 000 001 101 011 | 0153 |
| 425 | 000 011 101 011 | 0353 |
| 426 | 000 111 101 001 | 0751 |
| 427 | 011 100 000 011 | 3403 |
| 430 | 101 100 011 011 | 5433 |
| 431 | 000 001 101 001 | 0151 |
| 432 | 000 011 101 001 | 0351 |
| 433 | 100 100 111 101 | 4475 |
| 434 | 011 101 100 101 | 3545 |
| 435 | 101 111 110 000 | 5760 |
| 436 | 110 000 011 001 | 6031 |
| 437 | 100 100 110 010 | 4462 |
| 440 | 011 101 100 101 | 3545 |
| 441 | 101 111 110 000 | 5760 |
| 442 | 100 101 100 000 | 4540 |
| 443 | 100 101 000 111 | 4507 |
| 444 | 011 011 111 101 | 3375 |
| 445 | 101 101 100 001 | 5541 |
| 446 | 001 000 001 110 | 1016 |
| 447 | 000 000 101 111 | 0057 |
| 450 | 110 000 000 010 | 6002 |
| 451 | 100 110 100 000 | 4640 |
| 452 | 011 101 100 101 | 3545 |
| 453 | 101 100 001 001 | 5411 |
| 454 | 110 000 000 010 | 6002 |
| 455 | 100 110 100 000 | 4640 |
| 456 | 011 011 111 101 | 3375 |
| 457 | 101 100 001 001 | 5411 |
| 460 | 001 000 001 110 | 1016 |
| 461 | 000 010 101 111 | 0257 |
| 462 | 011 101 000 011 | 3503 |
| 463 | 101 100 001 001 | 5411 |
| 464 | 111 110 000 110 | 7606 |
| 465 | 011 001 000 011 | 3103 |
| 466 | 101 101 110 101 | 5565 |
| 467 | 100 100 000 000 | 4400 |
| 470 | 100 101 010 001 | 4521 |
| 471 | 001 000 011 100 | 1034 |
| 472 | 000 000 111 011 | 0073 |
| 473 | 001 000 001 001 | 1011 |
| 474 | 100 111 001 110 | 4716 |
| 475 | 011 000 000 011 | 3003 |
| 476 | 101 101 000 100 | 5504 |
| 477 | 010 111 001 000 | 2710 |
| 500 | 010 110 001 000 | 2610 |
| 501 | 010 010 101 000 | 2250 |
| 502 | 100 101 001 010 | 4512 |

| | | | | | |
|---|---|---|---|---|---|
| 503 | 101 | 101 | 011 | 101 | 5535 |
| 504 | 011 | 111 | 000 | 101 | 3705 |
| 505 | 101 | 101 | 101 | 000 | 5550 |
| 506 | 001 | 000 | 101 | 011 | 1053 |
| 507 | 011 | 001 | 000 | 011 | 3103 |
| 510 | 101 | 101 | 010 | 100 | 5524 |
| 511 | 100 | 100 | 111 | 101 | 4475 |
| 512 | 110 | 011 | 100 | 101 | 6345 |
| 513 | 000 | 000 | 101 | 000 | 0050 |
| 514 | 100 | 100 | 011 | 000 | 4430 |
| 515 | 001 | 000 | 001 | 011 | 1013 |
| 516 | 000 | 111 | 101 | 010 | 0752 |
| 517 | 000 | 001 | 101 | 011 | 0153 |
| 520 | 011 | 100 | 000 | 011 | 3403 |
| 521 | 101 | 101 | 010 | 100 | 5524 |
| 522 | 000 | 001 | 101 | 010 | 0152 |
| 523 | 000 | 011 | 101 | 010 | 0352 |
| 524 | 001 | 000 | 011 | 100 | 1034 |
| 525 | 000 | 010 | 101 | 010 | 0252 |
| 526 | 000 | 010 | 101 | 001 | 0251 |
| 527 | 100 | 101 | 100 | 000 | 4540 |
| 530 | 011 | 000 | 000 | 011 | 3003 |
| 531 | 101 | 100 | 001 | 110 | 5416 |
| 532 | 100 | 100 | 000 | 000 | 4400 |
| 533 | 100 | 100 | 011 | 000 | 4430 |
| 534 | 100 | 100 | 000 | 011 | 4403 |
| 535 | 100 | 110 | 011 | 111 | 4637 |
| 536 | 100 | 111 | 000 | 101 | 4705 |
| 537 | 011 | 100 | 000 | 011 | 3403 |
| 540 | 101 | 101 | 011 | 101 | 5535 |
| 541 | 110 | 011 | 100 | 111 | 6347 |
| 542 | 000 | 000 | 101 | 000 | 0050 |
| 543 | 110 | 011 | 111 | 111 | 6377 |
| 544 | 000 | 000 | 100 | 111 | 0047 |
| 545 | 110 | 000 | 000 | 001 | 6001 |
| 546 | 100 | 110 | 100 | 000 | 4640 |
| 547 | 101 | 100 | 000 | 000 | 5400 |
| 550 | 001 | 000 | 101 | 010 | 1052 |
| 551 | 011 | 001 | 000 | 011 | 3103 |
| 552 | 101 | 101 | 110 | 000 | 5560 |
| 553 | 001 | 000 | 001 | 010 | 1012 |
| 554 | 000 | 010 | 011 | 100 | 0234 |
| 555 | 011 | 101 | 000 | 011 | 3503 |
| 556 | 101 | 101 | 001 | 001 | 5511 |
| 557 | 101 | 101 | 010 | 100 | 5524 |
| 560 | 001 | 000 | 001 | 011 | 1013 |
| 561 | 000 | 010 | 011 | 100 | 0234 |
| 562 | 011 | 101 | 000 | 011 | 3503 |
| 563 | 101 | 101 | 011 | 101 | 5535 |
| 564 | 101 | 101 | 001 | 001 | 5511 |
| 565 | 100 | 100 | 010 | 110 | 4426 |
| 566 | 001 | 000 | 001 | 011 | 1013 |
| 567 | 000 | 010 | 101 | 001 | 0251 |
| 570 | 000 | 001 | 101 | 011 | 0153 |
| 571 | 100 | 101 | 000 | 111 | 4507 |
| 572 | 100 | 101 | 100 | 000 | 4540 |
| 573 | 011 | 000 | 000 | 011 | 3003 |
| 574 | 101 | 100 | 001 | 110 | 5416 |
| 575 | 001 | 000 | 101 | 010 | 1052 |
| 576 | 011 | 001 | 000 | 011 | 3103 |
| 577 | 101 | 101 | 011 | 101 | 5535 |
| 600 | 011 | 111 | 000 | 101 | 3705 |
| 601 | 101 | 110 | 100 | 001 | 5641 |
| 602 | 110 | 011 | 100 | 110 | 6346 |
| 603 | 000 | 000 | 101 | 000 | 0050 |

| | | |
|---|---|---|
| 604 | 100 101 010 001 | 4521 |
| 605 | 001 000 011 100 | 1034 |
| 606 | 000 000 111 010 | 0072 |
| 607 | 001 000 001 001 | 1011 |
| 610 | 000 000 111 011 | 0073 |
| 611 | 100 111 001 111 | 4717 |
| 612 | 011 100 000 011 | 3403 |
| 613 | 101 110 100 001 | 5641 |
| 614 | 001 001 001 001 | 1111 |
| 615 | 000 000 100 111 | 0047 |
| 616 | 000 001 101 001 | 0151 |
| 617 | 000 001 101 010 | 0152 |
| 620 | 100 101 100 000 | 4540 |
| 621 | 010 011 000 110 | 2306 |
| 622 | 100 100 111 001 | 4471 |
| 623 | 011 000 000 101 | 3005 |
| 624 | 101 110 100 101 | 5645 |
| 625 | 100 100 110 001 | 4461 |
| 626 | 011 000 000 101 | 3005 |
| 627 | 101 110 100 101 | 5645 |
| 630 | 011 100 000 101 | 3405 |
| 631 | 101 110 101 011 | 5653 |
| 632 | 100 100 110 001 | 4461 |
| 633 | 011 100 000 101 | 3405 |
| 634 | 101 110 101 011 | 5653 |
| 635 | 110 000 000 010 | 6002 |
| 636 | 100 100 101 010 | 4452 |
| 637 | 010 111 000 110 | 2706 |
| 640 | 101 101 011 101 | 5535 |
| 641 | 110 011 100 111 | 6347 |
| 642 | 000 000 101 000 | 0050 |
| 643 | 100 101 001 010 | 4512 |
| 644 | 101 101 011 101 | 5535 |
| 645 | 110 000 000 010 | 6002 |
| 646 | 100 111 011 000 | 4730 |
| 647 | 011 100 000 011 | 3403 |
| 650 | 101 110 110 001 | 5661 |
| 651 | 100 100 111 101 | 4475 |
| 652 | 101 110 010 011 | 5623 |
| 653 | 110 000 001 000 | 6010 |
| 654 | 100 111 011 000 | 4730 |
| 655 | 011 100 000 011 | 3403 |
| 656 | 101 110 110 001 | 5661 |
| 657 | 100 100 111 101 | 4475 |
| 660 | 101 110 011 000 | 5630 |
| 661 | 100 101 011 100 | 4534 |
| 662 | 010 111 000 110 | 2706 |
| 663 | 101 110 110 011 | 5663 |
| 664 | 000 001 101 001 | 0151 |
| 665 | 100 101 100 000 | 4540 |
| 666 | 110 000 000 001 | 6001 |
| 667 | 100 110 100 000 | 4640 |
| 670 | 010 111 011 101 | 2735 |
| 671 | 011 001 100 101 | 3145 |
| 672 | 101 111 100 010 | 5742 |
| 673 | 100 100 110 001 | 4461 |
| 674 | 011 001 100 101 | 3145 |
| 675 | 101 111 100 010 | 5742 |
| 676 | 110 011 100 111 | 6347 |
| 677 | 000 000 101 000 | 0050 |
| 700 | 011 001 000 101 | 3105 |
| 701 | 101 111 010 100 | 5724 |
| 702 | 100 100 110 001 | 4461 |
| 703 | 011 001 000 101 | 3105 |
| 704 | 101 111 010 100 | 5724 |

| | | | | | |
|---|---|---|---|---|---|
| 705 | 010 | 001 | 100 | 110 | 2146 |
| 706 | 010 | 110 | 000 | 110 | 2606 |
| 707 | 010 | 001 | 000 | 110 | 2106 |
| 710 | 110 | 000 | 111 | 110 | 6076 |
| 711 | 100 | 100 | 110 | 010 | 4462 |
| 712 | 010 | 010 | 000 | 110 | 2206 |
| 713 | 110 | 000 | 111 | 110 | 6076 |
| 714 | 100 | 100 | 110 | 010 | 4462 |
| 715 | 010 | 101 | 000 | 110 | 2506 |
| 716 | 010 | 101 | 100 | 110 | 2546 |
| 717 | 011 | 101 | 000 | 101 | 3505 |
| 720 | 101 | 111 | 001 | 111 | 5717 |
| 721 | 100 | 100 | 110 | 001 | 4461 |
| 722 | 011 | 101 | 000 | 101 | 3505 |
| 723 | 101 | 111 | 001 | 111 | 5717 |
| 724 | 010 | 010 | 000 | 110 | 2206 |
| 725 | 010 | 101 | 100 | 110 | 2546 |
| 726 | 011 | 111 | 011 | 101 | 3735 |
| 727 | 100 | 100 | 000 | 000 | 4400 |
| 730 | 100 | 101 | 010 | 001 | 4521 |
| 731 | 001 | 000 | 011 | 100 | 1034 |
| 732 | 000 | 000 | 101 | 001 | 0051 |
| 733 | 100 | 101 | 100 | 000 | 4540 |
| 734 | 100 | 110 | 011 | 111 | 4637 |
| 735 | 011 | 111 | 111 | 101 | 3775 |
| 736 | 101 | 110 | 111 | 000 | 5670 |
| 737 | 011 | 100 | 100 | 101 | 3445 |
| 740 | 101 | 110 | 110 | 110 | 5666 |
| 741 | 101 | 011 | 100 | 011 | 5343 |
| 742 | 011 | 011 | 111 | 101 | 3375 |
| 743 | 101 | 111 | 010 | 100 | 5724 |
| 744 | 001 | 000 | 001 | 110 | 1016 |
| 745 | 000 | 000 | 101 | 111 | 0057 |
| 746 | 100 | 110 | 011 | 111 | 4637 |
| 747 | 011 | 011 | 111 | 101 | 3375 |
| 750 | 101 | 111 | 010 | 100 | 5724 |
| 751 | 001 | 000 | 001 | 110 | 1016 |
| 752 | 000 | 010 | 101 | 111 | 0257 |
| 753 | 011 | 101 | 000 | 011 | 3503 |
| 754 | 101 | 111 | 010 | 100 | 5724 |
| 755 | 010 | 011 | 011 | 101 | 2335 |
| 756 | 000 | 000 | 101 | 000 | 0050 |
| 757 | 101 | 111 | 000 | 000 | 5700 |
| 760 | 110 | 000 | 000 | 001 | 6001 |
| 761 | 100 | 111 | 011 | 000 | 4730 |
| 762 | 011 | 000 | 000 | 011 | 3003 |
| 763 | 101 | 100 | 011 | 011 | 5433 |
| 764 | 100 | 101 | 011 | 100 | 4534 |
| 765 | 100 | 100 | 010 | 110 | 4426 |
| 766 | 001 | 000 | 001 | 011 | 1013 |
| 767 | 000 | 010 | 101 | 001 | 0251 |
| 770 | 000 | 001 | 101 | 011 | 0153 |
| 771 | 100 | 101 | 100 | 000 | 4540 |
| 772 | 011 | 101 | 100 | 101 | 3545 |
| 773 | 101 | 111 | 111 | 010 | 5772 |
| 774 | 101 | 100 | 011 | 011 | 5433 |
| 775 | 000 | 000 | 000 | 000 | 0000 |
| 776 | 000 | 000 | 000 | 000 | 0000 |
| 777 | 101 | 011 | 100 | 011 | 5343 |

What has been described above is a novel control system for a vending or like machine. The invention is not limited to the specific embodiments disclosed herein, but is intended to cover such changes, alternatives and modifications as may occur to those skilled in the art, insofar as such changes, alternatives and modifications fall within the spirit and scope of the appended claims.

The invention is claimed as follows:

1. In a vending machine or the like having a plurality of money accepting means each for accepting a monetary unit of a different denomination, means for selecting articles to be vended and for requesting refunds, and means for dispensing the selected articles and for dispensing refunds, a control system comprising: money input circuit means coupled to said money accepting means and responsive to each acceptance of a monetary unit for producing a monetary unit input signal corresponding to the acceptance of said monetary unit, selection input circuit means coupled to said article selecting means and to said refund requesting means and responsive both to selection of each article and to each refund request for producing a corresponding selection and refund request input signal indicating either that an article has been selected or a refund requested, encoding circuit means responsive respectively to said monetary input circuit means and to said selection input circuit means for producing respective encoded signals representing respectively the values of the monetary units accepted and the prices of articles selected, control circuit means responsive to said monetary unit input signal, to said encoded signals and to said selection and request input signal for identifying each article selected or refund requested, for determining the amount of credit initially available or remaining for selection of a first article or further articles or for refund and for producing a plurality of control signals and circuit means interposed between said control circuit means and said dispensing means and responsive to said control signals for dispensing as many articles as selected and for dispensing requested refunds so long as said initial or remaining credit is sufficient, and wherein said control circuit means comprises a special purpose computer.

2. A control system according to claim 1 wherein said encoding circuit means comprises a ROM.

3. A control system according to claim 2 wherein said ROM comprises an EAROM.

4. A control system according to claim 1 wherein said special purpose computer comprises a microprocessor and further including decoding circuit means interfacing between said microprocessor and said selecting and requesting means and between said microprocessor and said dispensing means.

5. A control system according to claim 4 further including display means coupled to said control circuit means and responsive to said control signals for providing an observable indication of the amount of credit available.

6. A control system according to claim 5 wherein said microprocessoi includes a plurality of input/output ports, a first one of said ports being coupled to said display means, a second one of said ports being coupled to said decoding circuit means and a third one of said ports being coupled to said encoding circuit means.

7. In a control system for a vending machine or the like including a monetary input circuit for producing a monetary input signal corresponding to each acceptance of a monetary unit by the vending machine, selection input circuit means responsive to user actuation of said vending machine to select an article to be vended or to request a refund or change for producing a selection input signal or a refund request input signal corresponding to each said actuation, the improvement comprising: encoding circuit means responsive respectively to said monetary input circuit means and said selection input circuit means for producing respective encoded signals representing respectively the values of the monetary units accepted and the prices of articles selected, and control circuit means responsive to said encoded signals, to said monetary unit input signals and to said selection and refund request input signals for identifying each article selected or refund requested, for determining the amount of credit initially available or remaining and for producing a plurality of control signals for controlling the operation of article dispensing means and refund or change dispensing means of said vending machine to dispense as many articles as selected and to dispense requested refunds so long as said initial or remaining credit is sufficient.

8. The improvement according to claim 7 wherein said control circuit means comprises a special purpose computer.

9. The improvement according to claim 8 wherein said special purpose computer comprises a microprocessor and further including a plurality of decoder means interfacing between said microprocessor and said article selection input circuits and said article delivery and change delivery means of said vending machine.

10. The improvement according to claim 9 and further including display means responsive to said control signals for producing an observable indication corresponding to the amount of credit available and a further observable indication when the credit available is insufficient for the selection of an article or for a refund or change.

11. The improvement according to claim 10 wherein said microprocessor includes a plurality of input/output ports, a first one of said ports being coupled to said display means, second one of said ports being coupled to said decoding circuit means and a third one of said ports being coupled to said encoding circuit means.

12. The improvement according to claim 7 wherein said encoding means comprises ROM means.

13. The improvement according to claim 12 wherein said ROM means comprises an electrically alterable ROM.

14. In a control circuit for a vending machine or the like, the combination comprising: encoding circuit means responsive to the acceptance of money deposited in said vending machine for producing first encoded signals representing the value of each monetary unit accepted and responsive to each selection of an article to be vended or to a request for a refund or change for producing a second encoded signal representing the price of the article selected or a refund signal representing a refund or change request, and control circuit means responsive to said first encoded signal, said second encoded signal and said refund signal for producing a plurality of control signals to control the dispensing of as many articles as selected and of any refund or change requested in accordance with a comparison between the first encoded signal and the second encoded signal, said first encoded signal being decremented by the corresponding second encoded signal as each article is dispensed, and wherein said control circuit means comprises a special purpose computer and wherein said encoding circuit means comprises programmable array means.

15. A control system according to claim 14 wherein said special purpose computer comprises a microprocessor.

16. A control system according to claim 14 wherein said array means comprises a ROM.

17. A control system according to claim 16 wherein said ROM comprises an EAROM.

* * * * *